(12) United States Patent  
DeLuca

(10) Patent No.: US 9,417,696 B2  
(45) Date of Patent: Aug. 16, 2016

(54) PORTABLE ELECTRONIC DEVICE AND METHOD THEREFOR

(75) Inventor: Michael Joseph DeLuca, Boca Raton, FL (US)

(73) Assignee: BlackBerry Limited, Waterloo, Ontario (CA)

( * ) Notice: Subject to any disclaimer, the term of this patent is extended or adjusted under 35 U.S.C. 154(b) by 681 days.

(21) Appl. No.: 13/015,066

(22) Filed: Jan. 27, 2011

(65) Prior Publication Data

US 2012/0194483 A1    Aug. 2, 2012

(51) Int. Cl.

| | |
|---|---|
| *G06F 3/044* | (2006.01) |
| *G06F 3/0354* | (2013.01) |
| *G06F 3/041* | (2006.01) |
| *G06F 3/042* | (2006.01) |
| *G06F 3/043* | (2006.01) |
| *G06F 3/01* | (2006.01) |
| *G06F 1/16* | (2006.01) |

(52) U.S. Cl.  
CPC .............. *G06F 3/016* (2013.01); *G06F 1/1643* (2013.01); *G06F 1/1652* (2013.01); *G06F 3/043* (2013.01); *G06F 3/0414* (2013.01)

(58) Field of Classification Search  
CPC ......... G06F 4/041; G06F 3/016; G06F 3/044; G06F 3/0412; G06F 3/0354; G06F 3/041; G06F 3/042; G06F 3/043; G06F 3/01  
USPC ....................................... 345/177; 178/18.04  
See application file for complete search history.

(56) References Cited

U.S. PATENT DOCUMENTS

| | | |
|---|---|---|
| 4,682,159 A | 7/1987 | Davison |
| 4,988,981 A | 1/1991 | Zimmerman et al. |
| 6,135,963 A * | 10/2000 | Haider ................ G01S 15/102 600/447 |
| 6,424,334 B1 | 7/2002 | Zimmerman et al. |
| 7,205,979 B2 | 4/2007 | Zimmerman et al. |
| 7,646,379 B1 * | 1/2010 | Drennan ............ G06F 3/03545 178/18.01 |

(Continued)

FOREIGN PATENT DOCUMENTS

| | | |
|---|---|---|
| EP | 2256592 | 12/2010 |
| JP | 2007094993 | 4/2007 |

(Continued)

OTHER PUBLICATIONS

European Search Report dated Jul. 1, 2011; corresponding application No. 11152331.2.

*Primary Examiner* — Temesgh Ghebretinsae  
*Assistant Examiner* — Paras D Karki  
(74) *Attorney, Agent, or Firm* — Fish & Richardson P.C.

(57) ABSTRACT

An electronic device includes a touch-sensitive display, and a plurality of piezoelectric patch transducers disposed beneath the display. A controller is configured to switch each of the transducers between a tactile feedback mode to provide tactile feedback via the touch-sensitive display, and an object detection mode to provide acoustic detection of a contactless position of an object relative to the device. The object is free of contact with the device at the contactless object position. Using the same transducers to provide tactile feedback and object detection provides these features without additional costs associated with adding further components. A microphone of the device can receive ultrasonic signals, emitted from the transducers and via associated acoustic ports, and the device can process the received signals to determine a contactless three-dimensional gesture that is performed, for example above the display.

18 Claims, 5 Drawing Sheets

(56) References Cited

U.S. PATENT DOCUMENTS

| | | | |
|---|---|---|---|
| 7,683,883 B2 | 3/2010 | Touma | |
| 8,254,209 B2* | 8/2012 | Yamanaka | B06B 1/02 367/118 |
| 8,310,351 B2* | 11/2012 | Krahenbuhl | G06F 1/1626 340/407.2 |
| 9,123,258 B2* | 9/2015 | Makinen | G09B 21/004 |
| 9,176,587 B2* | 11/2015 | Suzuki | G06F 3/041 |
| 2003/0138121 A1 | 7/2003 | Reck | |
| 2004/0037236 A1 | 2/2004 | Massey et al. | |
| 2005/0069205 A1 | 3/2005 | Khomo | |
| 2005/0083314 A1* | 4/2005 | Shalit | G06F 1/1626 345/179 |
| 2007/0120834 A1 | 5/2007 | Boillot | |
| 2007/0211022 A1 | 9/2007 | Boillot | |
| 2008/0005703 A1* | 1/2008 | Radivojevic | G06F 1/1626 715/863 |
| 2008/0068348 A1* | 3/2008 | Rosenberg | A63F 13/06 345/173 |
| 2008/0291784 A1* | 11/2008 | Yamanaka | B06B 1/02 367/99 |
| 2009/0044626 A1* | 2/2009 | Liu | B06B 1/0276 73/632 |
| 2009/0139778 A1 | 6/2009 | Butler et al. | |
| 2010/0095206 A1 | 4/2010 | Kim | |
| 2010/0156814 A1* | 6/2010 | Weber | G06F 3/016 345/173 |
| 2010/0328314 A1* | 12/2010 | Ellingham | G06Q 50/06 345/440 |
| 2011/0038114 A1* | 2/2011 | Pance | G06F 1/1616 361/679.4 |
| 2012/0050180 A1* | 3/2012 | King | G06F 3/0416 345/173 |
| 2012/0102436 A1* | 4/2012 | Nurmi | G06F 1/1613 715/863 |
| 2012/0130248 A1* | 5/2012 | Fatemi | A61B 8/06 600/454 |
| 2012/0206339 A1* | 8/2012 | Dahl | G06F 3/043 345/156 |
| 2012/0229400 A1* | 9/2012 | Birnbaum | G06F 3/016 345/173 |
| 2012/0274610 A1* | 11/2012 | Dahl | G06F 3/0436 345/177 |

FOREIGN PATENT DOCUMENTS

| | | |
|---|---|---|
| WO | 2007144014 | 12/2007 |
| WO | 2008001202 | 1/2008 |
| WO | 2009147398 | 12/2009 |
| WO | 2010044579 | 4/2010 |

* cited by examiner

PORTABLE ELECTRONIC DEVICE AND METHOD THEREFOR

FIELD

The present disclosure relates to an electronic device, such as a portable electronic device having a touch-sensitive display.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones, Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified depending on the functions and operations being performed.

Improvements in electronic devices with touch-sensitive displays are desirable.

SUMMARY

According to one example embodiment, a portable electronic device includes a touch-sensitive display, a plurality of piezoelectric patch transducers disposed beneath the display, and a controller in communication with the plurality of transducers. The controller is configured to switch each of the transducers between a tactile feedback mode to provide tactile feedback via the touch-sensitive display, and an object detection mode to provide acoustic detection of a contactless position of an object relative to the device.

In an example embodiment, the controller switches the plurality of piezoelectric patch transducers to operate in the tactile feedback mode in response to detection of a touch on the display. In another example embodiment, the controller switches the plurality of piezoelectric patch transducers to operate in the object detection mode in response to absence of a touch detection on the display for a predefined time period.

In an example embodiment in which the touch-sensitive display comprises a backlight, the controller operates the plurality of piezoelectric patch transducers in either the tactile feedback mode or the object detection mode only when the display backlight is active.

In another example embodiment, the device further includes a plurality of acoustic ports. Each of the plurality of acoustic ports is uniquely associated with one of the plurality of piezoelectric patch transducers to output an acoustic signal. In an example embodiment, in the object detection mode, each of the plurality of piezoelectric patch transducers is driven with a varying voltage to produce an ultrasonic signal that is output to the uniquely associated acoustic port.

In yet another example embodiment, the device further includes a microphone arranged to receive acoustic signals generated by the plurality of piezoelectric patch transducers in the object detection mode. In an example embodiment, in the object detection mode, the controller detects the contactless position of the object by performing a triangulation based on acoustic signals received at the microphone from the plurality of piezoelectric patch transducers. In an example embodiment, the controller comprises a processor configured to process a plurality of detected contactless object positions to determine a contactless gesture associated with the plurality of detected contactless object positions.

In another example embodiment, the plurality of piezoelectric patch transducers comprises at least three piezoelectric patch transducers, and the processor is configured to processes the plurality of detected contactless object positions to determine a three-dimensional gesture. In an example embodiment, the plurality of piezoelectric patch transducers comprises four piezoelectric patch transducers and four acoustic ports disposed proximate to the corners of the display.

In an example embodiment of the disclosure, a method of managing user interaction with a portable electronic device includes: providing, in a tactile feedback mode, tactile feedback via a plurality of piezoelectric patch transducers disposed beneath the device display; and providing, in an object detection mode and via the plurality of piezoelectric patch transducers, acoustic detection of a contactless position of an object relative to the device.

In an example embodiment, the plurality of piezoelectric patch transducers operate in the tactile feedback mode in response to detection of a touch on the display. In an example embodiment, the plurality of piezoelectric patch transducers operate in the object detection mode in response to absence of a touch detection on the display for a predefined time period.

In an example embodiment in which the device display comprises a backlight, the plurality of piezoelectric patch transducers operate in either the tactile feedback mode or the object detection mode only when the display backlight is active. In an example embodiment, the method further includes, in the object detection mode, driving at least some of the plurality of piezoelectric patch transducers with a varying voltage to produce an ultrasonic signal that is output to the associated acoustic port.

In an example embodiment, the method further includes receiving, at a microphone, acoustic signals generated by the plurality of piezoelectric patch transducers in the object detection mode. In an example embodiment, the method further includes detecting, in the object detection mode, the contactless position of the object by performing a triangulation based on acoustic signals received at the microphone from the plurality of piezoelectric patch transducers. In an example embodiment, the method further includes processing, at a processor, a plurality of detected contactless object positions to determine a contactless gesture associated with the plurality of detected contactless object positions.

In another example embodiment of the present disclosure, a non-transitory machine-readable memory is provided storing statements and instructions for execution by a processor to perform a method of controlling a portable electronic device as described and illustrated herein.

In a further example embodiment, a method of controlling a portable electronic device includes: switching a plurality of piezoelectric patch transducers between a tactile feedback mode to provide tactile feedback via a touch-sensitive display, and an object detection mode to provide acoustic detection of a contactless position of an object relative to the device.

Other aspects and features of the present disclosure will become apparent to those ordinarily skilled in the art upon review of the following description of specific embodiments in conjunction with the accompanying figures.

BRIEF DESCRIPTION OF THE DRAWINGS

Example embodiments of the present disclosure will now be described, by way of example only, with reference to the attached figures.

DETAILED DESCRIPTION

Figure 1:
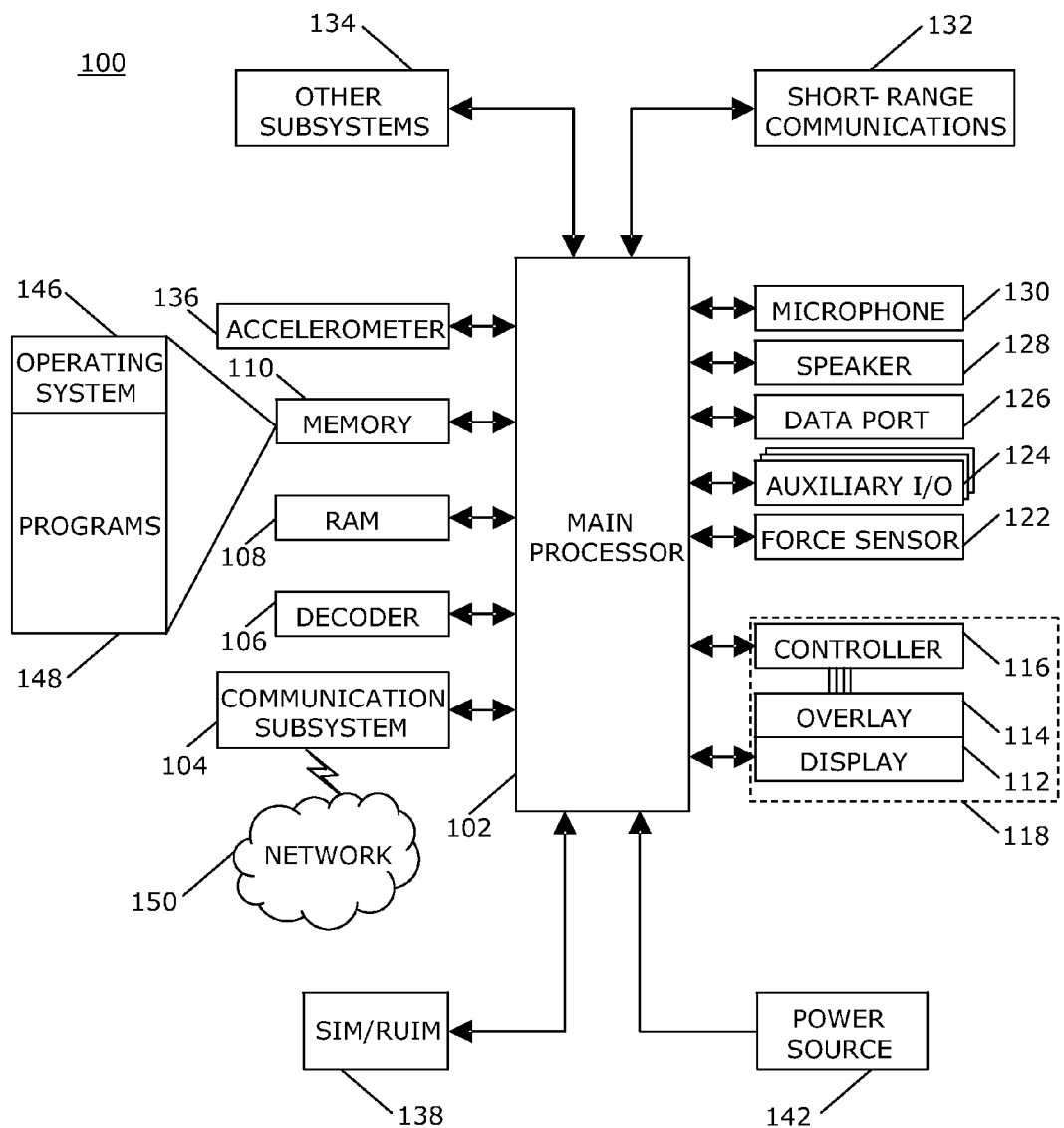
FIG. 1 is a block diagram of a portable electronic device in accordance with an example embodiment.

An electronic device includes a touch-sensitive display, and a plurality of piezoelectric patch transducers disposed beneath the display. A controller is configured to switch each of the transducers between a tactile feedback mode to provide tactile feedback via the touch-sensitive display, and an object detection mode to provide acoustic detection of a contactless position of an object relative to the device. The object is free of contact with the device at the contactless object position. Using the same transducers to provide tactile feedback and object detection provides these features without additional costs associated with adding further components. A microphone of the device can receive ultrasonic signals, emitted from the transducers and via associated acoustic ports, and the device can process the received signals to determine a contactless three-dimensional gesture that is performed, for example above the display.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

This disclosure generally relates to an electronic device, which is a portable electronic device in the embodiments described herein. Examples of portable electronic devices include mobile, or handheld, wireless communication devices such as pagers, cellular phones, cellular smartphones, wireless organizers, PDAs, wirelessly enabled notebook computers, tablet computers, and so forth. The portable electronic device may also be a portable electronic device without wireless communication capabilities, such as a handheld electronic game device, digital photograph album, digital camera, or other device.

A block diagram of an example of a portable electronic device 100 is shown in FIG. 1. The portable electronic device 100 includes multiple components, such as a processor 102 that controls the overall operation of the portable electronic device 100. The portable electronic device 100 presently described optionally includes a communication subsystem 104 and a short-range communications 132 module to perform various communication functions, including data and voice communications. Data received by the portable electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the portable electronic device 100.

The processor 102 interacts with other components, such as Random Access Memory (RAM) 108, memory 110, a display 112 with a touch-sensitive overlay 114 operably connected to an electronic controller 116 that together comprise a touch-sensitive display 118, an auxiliary input/output (I/O) subsystem 124, a data port 126, a speaker 128, a microphone 130, short-range communications 132, and other device subsystems 134. User-interaction with a graphical user interface presented on display 112 is performed through the touch-sensitive overlay 114. The memory 110 can include graphics memory accessed by the controller 116 to render graphic content for display on to the display 112. The processor 102 interacts with the touch-sensitive overlay 114 via the electronic controller 116. Information, such as text, characters, symbols, images, icons, and other items that may be displayed or rendered on a portable electronic device, is displayed on the touch-sensitive display 118 via the processor 102. The processor 102 may interact with an orientation sensor or motion sensor such as an accelerometer 136 that may be utilized to detect direction of gravitational forces or gravity-induced reaction forces.

To identify a subscriber for network access, the portable electronic device 100 uses a Subscriber Identity Module or a Removable User Identity Module (SIM/RUIM) card 138 for communication with a network, such as the wireless network 150. Alternatively, user identification information may be programmed into memory 110.

The portable electronic device 100 includes an operating system 146 and software programs or components 148 that are executed by the processor 102 and are typically stored in a persistent, updatable store such as the memory 110. Additional applications or programs may be loaded onto the portable electronic device 100 through the wireless network 150, the auxiliary I/O subsystem 124, the data port 126, the short-range communications subsystem 132, or any other suitable subsystem 134.

A received signal, such as a text message, an e-mail message, or web page download, is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the portable electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive, resistive, infrared, surface acoustic wave (SAW) touch-sensitive display, strain gauge, optical imaging, dispersive signal technology, acoustic pulse recognition, and so forth, as known in the art. A capacitive touch-sensitive display includes a capacitive touch-sensitive overlay 114. The overlay 114 may be an assembly of multiple layers in a stack which may include, for example, a substrate, a ground shield layer, a barrier layer, one or more capacitive touch sensor layers separated by a substrate or other barrier, and a cover. The capacitive touch sensor layers may be any suitable material, such as patterned indium tin oxide (ITO).

One or more touches, also known as touch contacts or touch events, may be detected by the touch-sensitive display 118. The processor 102 may determine attributes of the touch, including a location of a touch. Touch location data may include an area of contact or a single point of contact, such as a point at or near a center of the area of contact. A signal is provided to the controller 116 in response to detection of a touch. A touch may be detected from any suitable object, such as a finger, thumb, appendage, or other items, for example, a stylus, pen, or other pointer, depending on the nature of the touch-sensitive display 118. The controller 116 and/or the processor 102 may detect a touch by any suitable contact member on the touch-sensitive display 118. Similarly, multiple simultaneous touches are detected.

One or more gestures are also detected by the touch-sensitive display 118. A gesture, such as a swipe, also known as a flick, is a particular type of touch on a touch-sensitive display 118 that begins at an origin point and continues to a finishing point. A gesture may be identified by attributes of the gesture, including the start point, the end point, the distance traveled, the duration, the velocity, and the direction, for example. A gesture may be long or short in distance and/or duration. Two points of the gesture may be utilized to determine a direction of the gesture.

In some embodiments, optional force sensor(s) 122 may be disposed in any suitable location, for example, between the touch-sensitive display 118 and a back of the portable electronic device 100 to detect a force imparted by a touch on the touch-sensitive display 118. The force sensor 122 may be a force-sensitive resistor, strain gauge, piezoelectric or piezoresistive device, pressure sensor, or other suitable device. Force as utilized throughout the specification refers to force measurements, estimates, and/or calculations, such as pressure, deformation, stress, strain, force density, force-area relationships, thrust, torque, and other effects that include force or related quantities. The processor 102 may also interact with one or more force sensors 122.

Force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

Figure 2:
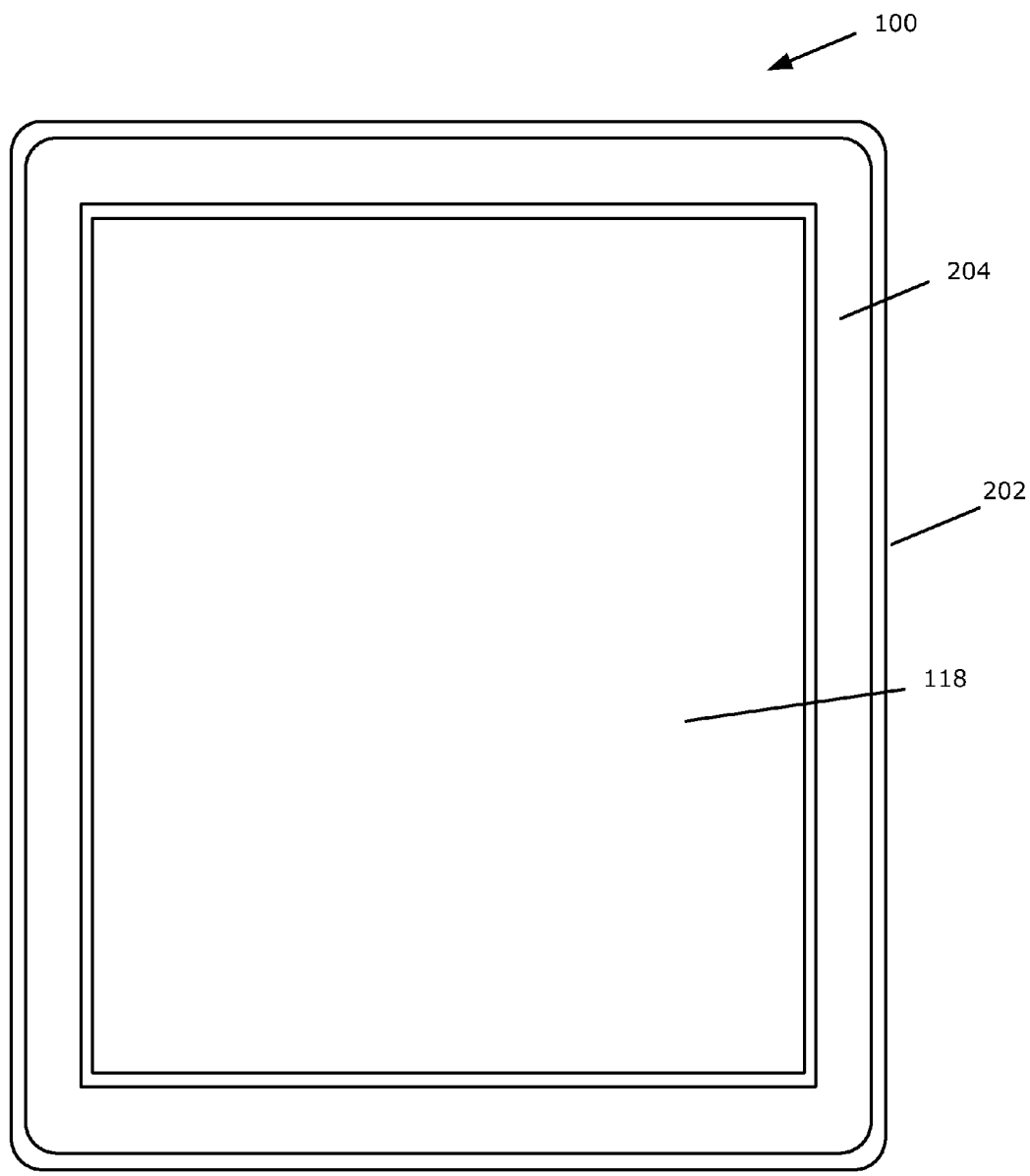
FIG. 2 is a front view of an example of a portable electronic device.

A view of an example of the portable electronic device 100 is shown in FIG. 2. The portable electronic device 100 includes a housing 202 that encloses components such as shown in FIG. 1. The housing 202 may include a front 204, and a back and sidewalls (not shown). The front 204 of the housing includes openings in which the touch-sensitive display 118 is exposed.

Detection of touches or gestures on a touch-sensitive display 118 of the device 110 provides navigational advantages. Detection of gesturing relative to the device, such as above the display 112, allows for enhanced user interface (UI) functionality. However, gesture determination above a portable electronic device can add significant product cost to a device.

A contactless position, or contactless object position, is an object position at which the object is free of contact with the portable electronic device 100. For example, an object is in a contactless object position when the object is free of contact with the display 112. Contactless object movement is an object movement during which the object is free of contact with the device 100. A contactless gesture is based on contactless object movement. For example, a contactless gesture can include a contactless object movement above the display 112 of the device 100, without making contact with the display 112. Contactless object position and movement is in contrast to a gesture made on the display 112, such as the type of gesture typically associated with a device having a touch-sensitive display.

A three-dimensional gesture includes a gesture associated with movement that has at least one component in an axis or plane additional to the plane of the display 112 of the device 100. A standard gesture on a touch-sensitive display can include movement in the x and y axes and can also include contributions based on time delay, force intensity, and other factors. A three-dimensional gesture is a gesture performed relative to the device 100, such as above the display 112. Adding a further z axis component to a gesture can expand the number, type and variation of gestures that can be used to control the device 100. In example embodiments described herein, a contactless three-dimensional gesture is performed relative to the device 100 without making contact with the display 112.

Examples of three-dimensional gestures and their determination are discussed in United States Patent Application Publication No. 2008/005703A1 entitled "Apparatus, methods and computer program products providing finger-based and hand-based gesture commands for portable electronic device applications". Other discussions of examples of three-dimensional gestures and their determination are found in the following: United States Patent Application Publication No. 2009/0139778A1 entitled "User Input Using Proximity Sensing"; United States Patent Application Publication No. 2007/02211022A1 entitled "Method and Device for Three-Dimensional Sensing". Each of these documents is incorporated herein by reference.

A device including a touch-sensitive display with active haptic feedback can utilize piezoelectric transducers to generate the sensation of touch feedback when the user touches the display. One example is described in United States Patent Application Publication No. 2010/0156814A1 entitled "Portable Electronic Device Including Tactile Touch-Sensitive Input Device and Method of Controlling Same", which is incorporated herein by reference. Example embodiments described herein utilize the same piezoelectric transducers to also facilitate detection of contactless gestures above the display.

Figure 3:
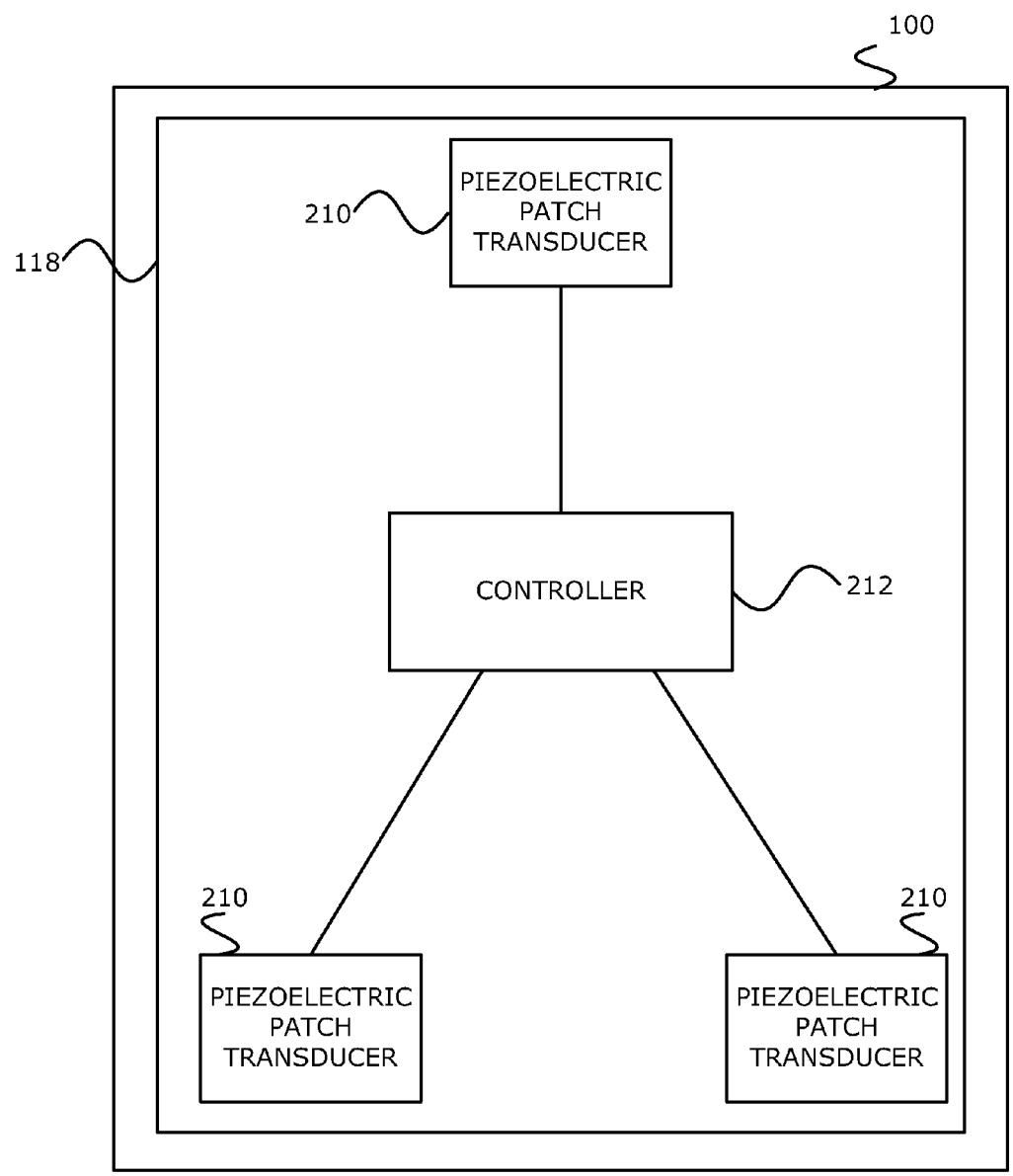
FIG. 3 illustrates a block diagram of a portable electronic device according to an example embodiment.

FIG. 3 illustrates a block diagram of a portable electronic device 100 according to an example embodiment. The device 100 includes a touch-sensitive display 118 and an array of piezoelectric patch transducers. In the example embodiment of FIG. 3, the array includes a plurality of piezoelectric patch transducers 210 disposed beneath the display 118. In an example embodiment, the piezoelectric patch transducers 210 are integral with the one or more force sensors 122, shown in FIG. 1.

A controller 212 is in communication with the plurality of transducers 210. The controller 212 is configured to switch each of the transducers 210 between a tactile feedback mode and an object detection mode. In the tactile feedback mode, the transducers 210 provide tactile feedback via the touch-sensitive display 118. In the object detection mode, the transducers 210 provide acoustic detection of a contactless position of an object relative to device 100, such as relative to the transducers 210, and consequently relative to the display 118 beneath which the transducers are disposed. In an example embodiment, the controller 212 can be integral with the electronic controller 116, or with the processor 102, shown in FIG. 1.

In an embodiment, the controller 212 switches the plurality of piezoelectric patch transducers 210 to operate in the tactile feedback mode in response to detection of a touch on the display 118. In an embodiment, the controller 212 switches the plurality of piezoelectric patch transducers 210 to operate in the object detection mode in response to absence of a touch detection on the display 118 for a predefined time period.

The predefined time period can be adjusted based on user specification, or based on detected user interaction over time, and can be varied based on the context or the active application. This time period facilitates interaction with the touch-sensitive display 118 with some regular delay expected with particular interactions. For example, when a user is typing on a keypad displayed on the display 118, the controller 212 allows the user to continue typing without automatically switching to gesture detection mode in between soft key presses. In an example embodiment, the controller 212 waits for about 100 milliseconds after the last touch detection on the display 118 before switching the transducers 210 from tactile feedback mode to object detection mode.

In an embodiment, the touch-sensitive display 118 comprises a backlight. In an example embodiment, the controller 212 operates the plurality of piezoelectric patch transducers 210 in either the tactile feedback mode or the object detection mode only when the display backlight is active. For example, driving the transducers 210 with ultrasonic signals can occur when there is no detected touch and when the backlight is active. If the display backlight is inactive, the controller 212 can power off the transducers 210, or put them in a sleep mode or other reduced power mode. The controller can power off the transducers 210 using similar triggers or conditions as the device uses for deactivating the backlight.

Figure 4:
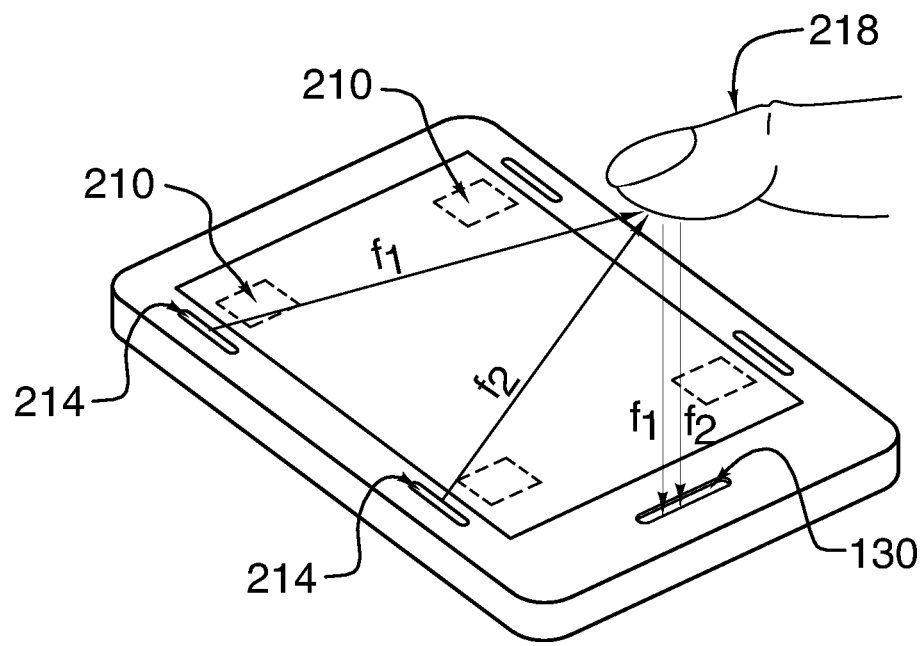
FIG. 4 illustrates a depiction of a portable electronic device according to another example embodiment.

FIG. 4 illustrates a depiction of a portable electronic device according to another example embodiment. A plurality of acoustic ports 214 are provided, each of the plurality of acoustic ports 214 being uniquely associated with one of the plurality of piezoelectric patch transducers 210 to output an acoustic signal. Each acoustic port 214 is an opening through which the output of a transducer 210 is sent. In one example embodiment, the acoustic port 214 is a hole or other aperture in the device housing. In another example embodiment, the acoustic port 214 comprises a porting mechanism shaped and constructed to tune to desired frequencies.

In the object detection mode, each of the plurality of piezoelectric patch transducers 210 is driven with a varying voltage to produce an ultrasonic signal that is output to the uniquely associated acoustic port 214. Methods of driving piezoelectric transducers are within the scope of a person of ordinary skill in the art given the present description. In one example, the controller 212 turns on and pulses the transducers 210 one at a time at an ultrasonic frequency. In another example, the controller 212 adjusts the modulation to generate high frequency audio for the object detection mode, and low frequency audio for the tactile feedback mode. Such modulation can include one or more of: pulsing the transducers individually; pulsing the transducers simultaneously; pulsing the transducers at different frequencies; or performing Doppler shifting.

As shown in the example embodiment of FIG. 4, the device 100 comprises a microphone 130 arranged to receive acoustic signals generated by the plurality of piezoelectric patch transducers 210 in the object detection mode. In the object detection mode, the controller 212 can detect the contactless position of an object 218 by performing a triangulation based on acoustic signals received at the microphone 130 from the plurality of piezoelectric patch transducers 210. In the example embodiment of FIG. 4, the acoustic ports 214 allow an output of the transducers 210, which began as an ultrasonic sound transmission, to be ported out the front of the device 100 to be received in audible form by the microphone 130.

The object 218 can be a finger, thumb, appendage, or other items, for example, a stylus, pen, or other pointer, depending on the nature of the touch-sensitive display 118. The contactless position of the object 218 can be detected by detecting an "echo time", or a time delta between when a pulse is generated by the acoustic port 214 and when it is received by the microphone 130. The path followed by the acoustic signal can be represented by an ellipse or parabola having end points at the acoustic port 214 and the microphone 130. A signal from one acoustic port/transducer pair provides one dimension for determining the position of the object 218.

In an example embodiment, only two transducer/acoustic port pairs are used to detect two-dimensional positions related to a contactless two-dimensional gesture. The use of only two transducer/acoustic port pairs can be achieved either by selectively powering two out of a plurality of more than two transducer/acoustic port pairs, or if the device only has two such pairs.

When such steps are performed with respect to at least three acoustic ports, the contactless position of the object 218 can be triangulated. If such steps are performed in real time, or substantially in real time, the motion of the object 218 can be determined based on the positions over time, and an associated contactless three-dimensional gesture can be determined.

Using four or more acoustic port/transducer pairs provides additional accuracy. In an example embodiment, the transducers 210 enable triangulation of the contactless position of the object 218 above the display 118. If a first transducer 210 generates an ultrasonic signal, the signal is later received by the microphone 130, with the delay in between being the "time of flight", or time delta. In FIG. 4, a time of flight f1 from a first transducer 210 is shown to include a first component from the acoustic port 214 to the object 218, and a second component from the object 218 to the microphone 130. A similar two-component time of flight f2 is shown with respect to a second transducer 210. By adding determinations from each of the transducers 210, an object's contactless positions or locations over time, and thus motion or movement, can be determined with substantial accuracy.

In an example embodiment, the controller 212 comprises or is integral with a processor, such as the processor 102. The processor is configured to process a plurality of detected contactless object positions to determine a contactless gesture associated with the plurality of detected contactless object positions. In another example embodiment, the plurality of piezoelectric patch transducers 210 comprise at least three piezoelectric patch transducers, and the processor is configured to processes the plurality of detected contactless object positions to determine a contactless three-dimensional gesture. In the example embodiment of FIG. 4, the plurality of piezoelectric patch transducers comprises four piezoelectric patch transducers 210 and four acoustic ports 214 disposed proximate to the corners of the display 118.

Figure 5:
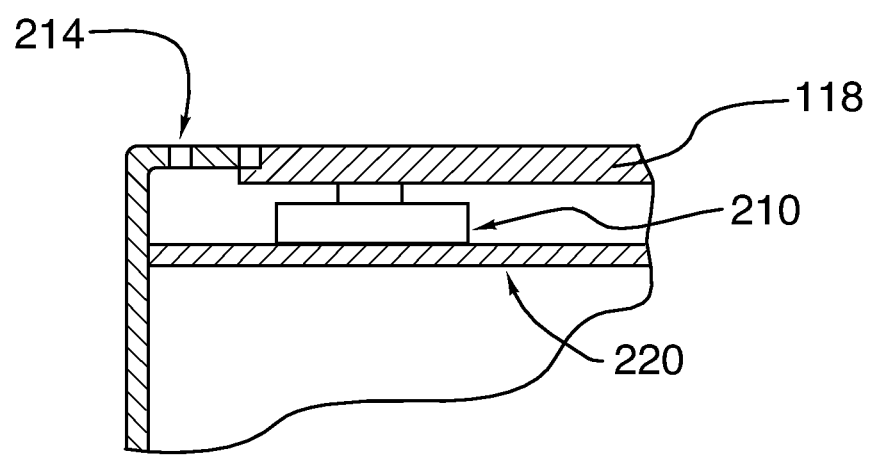
FIG. 5 illustrates a side cross-sectional view of a corner of the portable electronic device of FIG. 4.

FIG. 5 illustrates a side cross-sectional view of a corner of the portable electronic device 100 of FIG. 4. The example embodiment in FIG. 5 provides an illustration of a relative position of an acoustic port 214 and the associated piezoelectric patch transducer 210 disposed beneath the display 118. The piezoelectric patch transducer is in electrical communication with a printed circuit board (PCB) 220 of the device 100.

Figure 6:
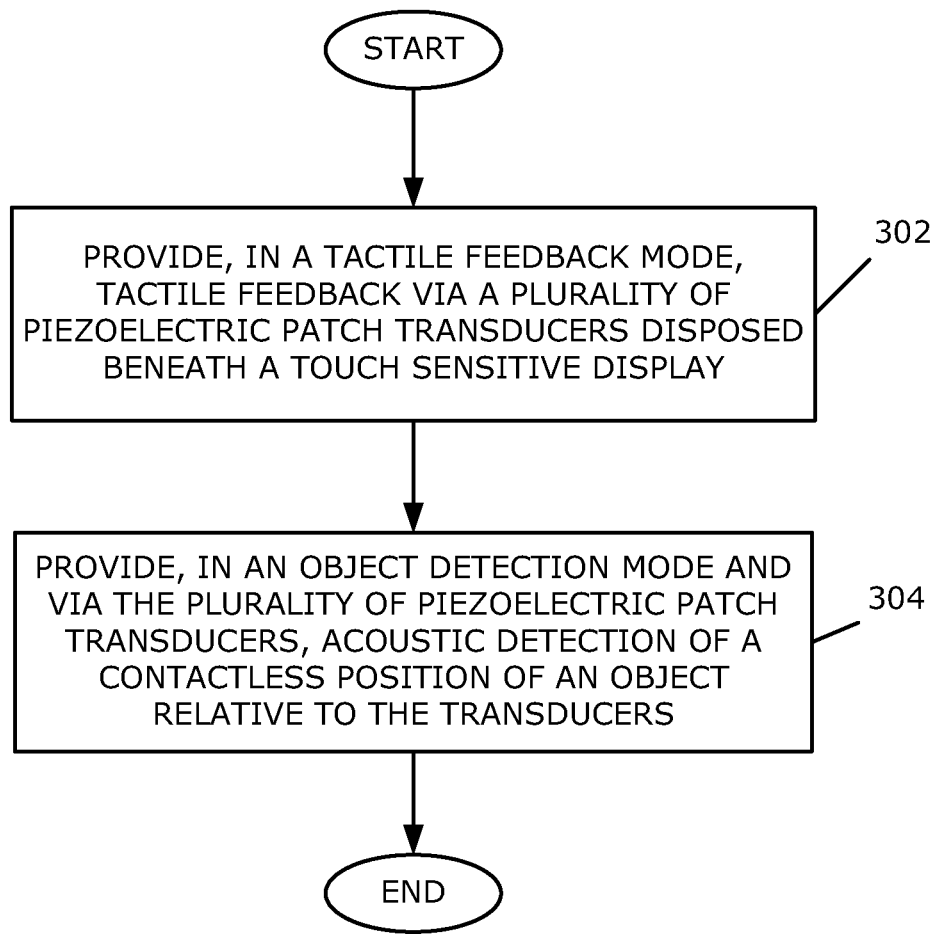
FIG. 6 is a flowchart illustrating a method of controlling a portable electronic device according to an example embodiment.

FIG. 6 is a flowchart illustrating a method of managing user interaction with a portable electronic device, such as the portable electronic device 100, according to an example embodiment. In an example embodiment, the method is carried out by computer-readable code executed, for example, by the processor 102. Coding of software for carrying out such a method is within the scope of a person of ordinary skill in the art given the present description. The method may contain additional or fewer processes than shown and/or described, and may be performed in a different order.

The method of the example embodiment of FIG. 6 includes the following: providing, in a tactile feedback mode, tactile feedback via a plurality of piezoelectric patch transducers disposed beneath a touch-sensitive display at 302; and providing, in an object detection mode and via the plurality of piezoelectric patch transducers, acoustic detection of a position of an object relative to the device at 304.

In another example embodiment, a method of controlling a portable electronic device includes: switching a plurality of piezoelectric patch transducers between a tactile feedback mode to provide tactile feedback via a touch-sensitive display, and an object detection mode to provide acoustic detection of a position of an object relative to the device.

In embodiments of the present disclosure, an electronic device uses the same transducers to provide both tactile feedback and object detection without additional costs associated with adding further components. In an example embodiment, ultrasonic signals, emitted from the transducers and via associated acoustic ports, can be processed to determine a contactless three-dimensional gesture that is performed, for example above the display. This provides enhanced user interface functionality and control without increased component cost.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A portable electronic device comprising:
a capacitive touch-sensitive display;
a plurality of piezoelectric patch transducers disposed beneath the display; and
a controller, in communication with the plurality of transducers, configured to switch each of the transducers between a tactile feedback mode to provide a tactile feedback via the plurality of transducers through the capacitive touch sensitive display, and a contactless object detection mode to provide acoustic detection of contactless position of an object relative to the device by switching the acoustic frequency of each of the transducer from a first frequency in the tactile feedback mode to a second frequency in the contactless object detection mode, wherein the second frequency is higher than the first frequency,
wherein the tactile feedback mode is activated in response to a touch detection by the capacitive touch-sensitive display; and
wherein the controller switches the plurality of piezoelectric patch transducers to operate in the object detection mode in response to absence of a touch detection on the capacitive touch-sensitive display for a predefined time period.

2. The device of claim 1 wherein the controller switches the plurality of piezoelectric patch transducers to operate in the tactile feedback mode in response to detection of a touch on the display.

3. The device of claim 1 wherein the touch-sensitive display comprises a backlight, and wherein the controller operates the plurality of piezoelectric patch transducers in either the tactile feedback mode or the object detection mode only when the display backlight is active.

4. The device of claim 1 further comprising a plurality of acoustic ports, each of the plurality of acoustic ports being uniquely associated with one of the plurality of piezoelectric patch transducers to output an acoustic signal.

5. The device of claim 4 wherein, in the object detection mode, each of the plurality of piezoelectric patch transducers is driven with a varying voltage to produce an ultrasonic signal that is output to the uniquely associated acoustic port.

6. The device of claim 1 further comprising a microphone arranged to receive acoustic signals generated by the plurality of piezoelectric patch transducers in the object detection mode.

7. The device of claim 6 wherein, in the object detection mode, the controller detects the contactless position of the object by performing a triangulation based on acoustic signals received at the microphone from the plurality of piezoelectric patch transducers.

8. The device of claim 7 wherein the controller comprises a processor configured to process a plurality of detected contactless object positions to determine a contactless gesture associated with the plurality of detected contactless object positions.

9. The device of claim 8 wherein the plurality of piezoelectric patch transducers comprises three piezoelectric patch transducers, and wherein the processor is configured to processes the plurality of detected contactless object positions to determine a contactless three-dimensional gesture.

10. The device of claim 8 wherein the plurality of piezoelectric patch transducers comprises four piezoelectric patch transducers and four acoustic ports disposed proximate to the corners of the display.

11. A method of managing user interaction with a portable electronic device comprising:
providing, in a tactile feedback mode, tactile feedback via a plurality of piezoelectric patch transducers through a capacitive touch-sensitive display, wherein the plurality of piezoelectric patch transducers is disposed beneath the capacitive touch-sensitive display;
providing, in a contactless object detection mode, via the plurality of piezoelectric patch transducers, acoustic detection of a contactless position of an object relative to the device,
wherein a controller, in communication with the plurality of transducers, switches each of the transducers between a tactile feedback mode and a contactless object detection mode by switching the acoustic frequency of each of the transducer from a first frequency in the tactile feedback mode to a second frequency in the contactless object detection mode, wherein the second frequency is higher than the first frequency,
wherein the tactile feedback mode is activated in response to a touch detection by the capacitive touch-sensitive display; and
wherein the controller switches the plurality of piezoelectric patch transducers to operate in the object detection mode in response to absence of a touch detection on the capacitive touch-sensitive display for a predefined time period.

12. The method of claim 11 further comprising operating the plurality of piezoelectric patch transducers in the tactile feedback mode in response to detection of a touch on the display.

13. The method of claim 11 wherein the device display comprises a backlight, and wherein the plurality of piezoelectric patch transducers operate in either the tactile feedback mode or the object detection mode only when the display backlight is active.

14. The method of claim 11 further comprising, in the object detection mode, driving at least some of the plurality of piezoelectric patch transducers with a varying voltage to produce an ultrasonic signal that is output to the associated acoustic port.

15. The method of claim 11 further comprising receiving, at a microphone, acoustic signals generated by the plurality of piezoelectric patch transducers in the object detection mode.

16. The method of claim 15 further comprising detecting, in the object detection mode, the contactless position of the object by performing a triangulation based on acoustic signals received at the microphone from the plurality of piezoelectric patch transducers.

17. The method of claim 16 further comprising processing, at a processor, a plurality of detected contactless object positions to determine a contactless three-dimensional gesture associated with the plurality of detected contactless object positions.

18. A non-transitory machine-readable memory storing statements and instructions for execution by a processor to perform a method of controlling a portable electronic device comprising:
providing, in a tactile feedback mode, tactile feedback via a plurality of piezoelectric patch transducers through a capacitive touch-sensitive display, wherein the plurality of piezoelectric patch transducers is disposed beneath the capacitive touch-sensitive display,
providing, in a contactless object detection mode, via the plurality of piezoelectric patch transducers, acoustic detection of a contactless position of an object relative to the device, wherein a controller, in communication with the plurality of transducers, switches each of the transducers between a tactile feedback mode and a contactless object detection mode by switching the acoustic frequency of each of the transducer from a first frequency in the tactile feedback mode to a second frequency in the contactless object detection mode, wherein the second frequency is higher than the first frequency,
wherein the tactile feedback mode is activated in response to a touch detection by the capacitive touch-sensitive display; and
wherein the controller switches the plurality of piezoelectric patch transducers to operate in the object detection mode in response to absence of a touch detection on the capacitive touch-sensitive display for a predefined time period.

* * * * *